J. J. AND G. E. ROYLE.
FLUID OPERATED AND THERMOSTATICALLY CONTROLLED VALVE MECHANISM.
APPLICATION FILED JAN. 10, 1916.
1,326,898.
Patented Dec. 30, 1919.
2 SHEETS—SHEET 1.
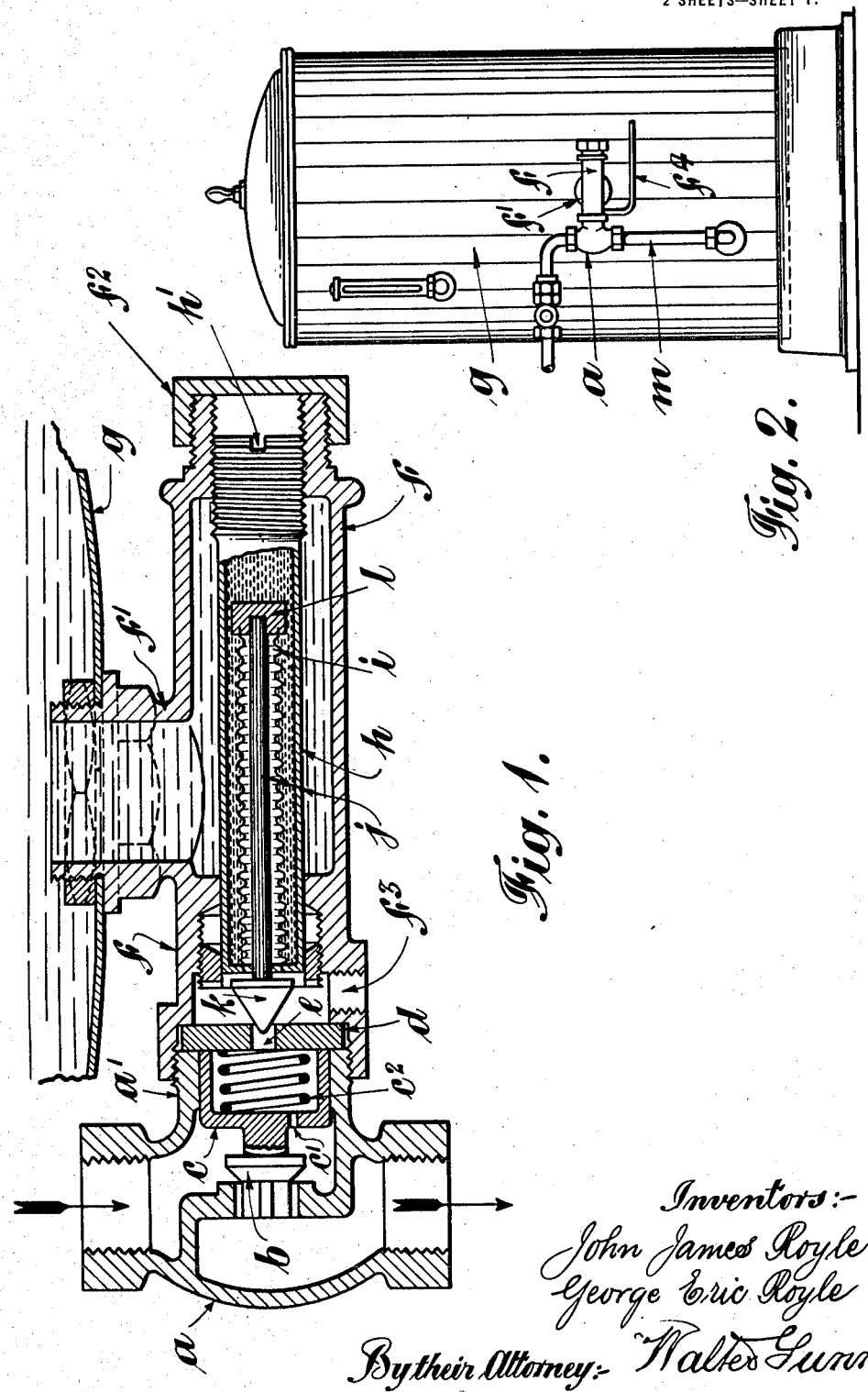
Inventors:—
John James Royle
George Eric Royle
By their Attorney:— Walter Gunn

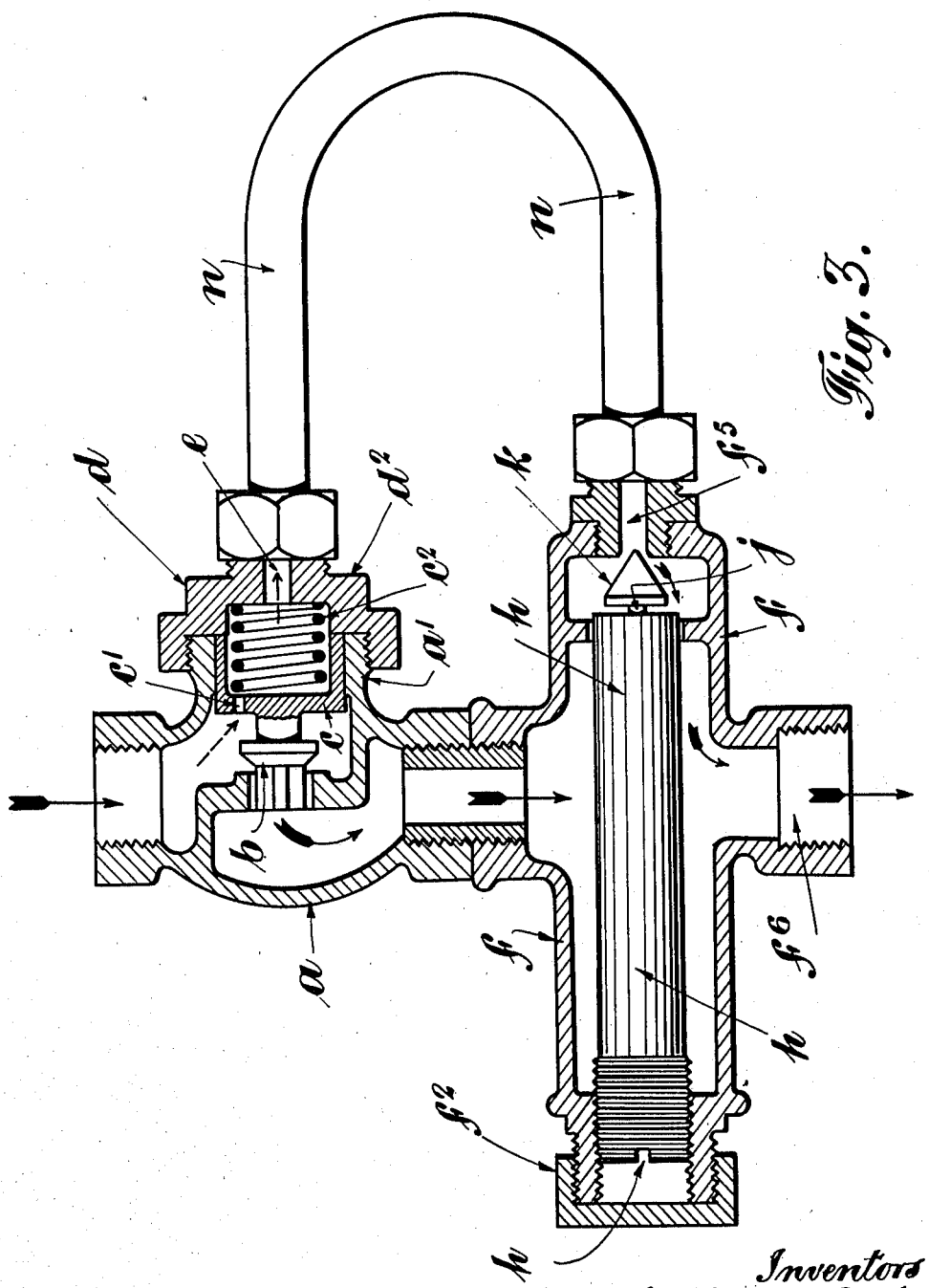

UNITED STATES PATENT OFFICE.

JOHN JAMES ROYLE AND GEORGE ERIC ROYLE, OF IRLAM, NEAR MANCHESTER, ENGLAND; EDWIN HARGRAVES, HARRY CHARLES DAVID SCOTT, AND GEORGE LEWIS RIDEHALGH, EXECUTORS OF SAID JOHN JAMES ROYLE, DECEASED, ASSIGNORS TO ROYLES LIMITED, OF IRLAM, ENGLAND, A FIRM.

FLUID-OPERATED AND THERMOSTATICALLY-CONTROLLED VALVE MECHANISM.

1,326,898.     Specification of Letters Patent.     Patented Dec. 30, 1919.

Application filed January 10, 1916. Serial No. 71,386.

*To all whom it may concern:*

Be it known that we, JOHN JAMES ROYLE and GEORGE ERIC ROYLE, both subjects of the King of Great Britain and Ireland, and residents of Irlam, near Manchester, England, have invented new or Improved Fluid-Operated and Thermostatically-Controlled Valve Mechanism, of which the following is a specification.

This invention refers to and consists of a new or improved construction and arrangement of inlet or outlet fluid-operated valve, and the combination therewith of a thermostat for controlling the valve, the invention being chiefly applicable to and being hereinafter described in connection with a hot water storage cylinder, and also in connection with a steam trap.

Upon the accompanying drawings:

Figure 1 illustrates a longitudinal sectional plan of the improved combined valve and thermostat, the valve being shown open. For the sake of clearly illustrating the invention, the valve casing is shown in a horizontal position *i. e.*, turned half-way around, its normal position being preferably vertical.

Fig. 2 illustrates the improved apparatus as applied to a hot water storage cylinder.

Fig. 3 illustrates a longitudinal section of the combined valve and thermostat as adapted for use as a steam trap.

Referring to Fig. 1, $a$ is the valve casing and $b$ the valve. In one with, or connected to the valve, is a piston $c$, designed to slide within the cylindrical extension $a'$ of the valve casing. In such piston is a small hole $c'$. At the end of the cylindrical extension $a'$ is a disk or plate $d$, in which is a central orifice or vent $e$. The diameter of the piston is larger than that of the valve, and behind the piston is a spring $c^2$ for helping to close the valve. As shown, the plate $d$ is held in position by being clamped between the end of the extension $a'$ and the end of the thermostat casing $f$. This casing, which may be of any suitable design is shown provided with a branch $f'$, by which it may be connected to the cylinder $g$ of the apparatus with which the improved controlling mechanism is to be used, the water in the cylinder having access to the interior of the casing $f$. Centrally arranged within the casing $f$ is the thermostat consisting preferably of a cylinder $h$, closed at both ends, a corrugated tube $i$ and a spindle $j$, this latter passing centrally through the tube $i$ and at one end extending loosely through the end of the cylinder $h$, where it is provided with a valve cone $k$. At its other end, the spindle is secured to a small block $l$ to which, and the end of the cylinder $h$, are respectively connected the ends of the corrugated tube $i$. The cylinder $h$ is screw-threaded externally at one end, and, by means of such screw thread and a saw cut $h'$ the cylinder is adapted to be adjustably screwed into one end of the casing $f$. At its other end the cylinder $h$ is packed to prevent leakage of any water from the interior of the casing $f$. A cap $f^2$ is provided to inclose the end of the casing $f$, while at a point below the valve cone $k$ in the casing is a drain outlet $f^3$. The cylinder $h$ is completely filled with an expansive gas or liquid, such as ether, mercury, or glycerin.

With the thermostat thus constructed and arranged, it will be seen that any increase of heat will cause the gas or liquid in the cylinder $h$ to expand, and, by acting upon the end of the block $l$, compress the corrugated tube endwise, and, through the spindle $j$, move the valve cone $k$ farther away from the cylinder end. Contrariwise, with any subsequent decrease of heat, the gas or liquid will contract and allow the corrugated tube $i$, under its own elasticity, to elongate, and through the spindle, draw the valve cone $k$ nearer to the cylinder end. This action of the expansive gas or liquid is used to operate the valve cone $k$ for the purpose of covering and uncovering the vent $e$ in the disk $d$. That is to say, the cylinder $h$ while cold is adjusted by the screw thread and saw-cut to hold the valve cone $k$ a short distance away from the vent $e$, see Fig. 1, the distance being such as to insure that when the maximum temperature is reached the valve cone will close the vent. Alternatively, the cylinder $h$ may be adjusted while hot, the valve cone $k$ being adjusted to cover the vent $e$ when the maximum temperature is reached.

The steam used in heating the water within the cylinder $g$ enters the cylinder via the main valve casing $a$ in the direction of the arrows, see Fig. 1. Until the vent $e$ is closed by the thermostat, the main valve $b$ remains fully open, being, in fact, held open by the pressure of the steam upon that side of the piston nearest the valve. Immediately, however, the valve cone $k$ closes the vent $e$, the steam acting through the small hole $c'$ in the piston, tends to establish an equilibrium of pressure on the two sides of the piston and allows the valve $b$, assisted by the spring $c^2$, to come to its seating, thus stopping (for the time being) any further flow of steam to the cylinder.

As soon as the temperature of the water in the cylinder falls, the thermostat is affected accordingly, whereupon the valve cone $k$ is caused to uncover the vent $e$ and allow the steam pressure to again act upon the piston to re-open the valve.

By varying the longitudinal adjustment of the cylinder $h$, the temperature at which the valve cone $k$ will cover the vent $e$ will vary.

In the example of hot water cylinder shown in Fig. 2, the steam enters the cylinder via pipe $m$ and circulates through a tube or tubes within the cylinder. A small drain pipe $f^4$ may be provided for conveying away the steam (or water of condensation) which escapes through the vent $e$.

Referring now to Fig. 3, which illustrates the invention as applied to a steam trap, the valve casing $a$ is joined to the casing $f$ of the thermostat, and the arrangement of the parts is such that the water of condensation and any steam passing the valve $b$, also passes through the thermostat casing. As in the previously described arrangements, the valve casing has a lateral extension $a'$ to receive the piston $c$, which latter is connected to the valve $b$. In the piston is a small hole $c'$. Applied to the end of the extension $a'$ is a cap $d$ having an orifice $e$. By means of a bent pipe $n$, the said orifice $e$ and the vent $f^5$ in the end of the thermostat casing, are placed in communication with each other. The thermostat is as previously described, the valve cone $k$ coming opposite the vent $f^5$ and being adjusted when cold to uncover the vent.

With the trap in use and the water of condensation following the course of the full line arrows being discharged, the steam following finds the valve $b$ fully open and flows through the thermostat casing and through the discharge outlet branch $f^6$. But upon the steam coming in contact with the thermostat, the liquid or gas in the cylinder $h$ expands and moves the spindle $j$ out until the valve cone $k$ covers the vent $f^5$. Immediately the vent is covered the steam closes the valve $b$, which, for the time being stops the flow of any more steam. With an accumulation of water of condensation above the valve $b$, and with the subsequent cooling of the thermostat, the liquid or gas in the cylinder $h$ contracts and allows the vent $f^5$ to be uncovered by the valve cone $k$, whereupon the valve $b$, under the preponderance of the pressure upon the piston $c$, instantly re-opens its full distance, and allows the water of condensation to escape. As soon, however, as the steam again comes, the vent $f^5$ is again covered and the valve $b$ again closed.

The valve $b$ being full open during the period of discharge, it affords a full-way passage for the water, a feature of importance where a large quantity of water requires to be ejected.

It will be understood that the casings $a$ and $f$ may be variously arranged and connected so long as the steam can pass through both when the valve $b$ is open.

In the example of steam trap so far described, Fig. 3, the thermostat is on the low pressure or atmospheric side of the valve $b$.

It will be seen that in each example of the invention the action of the main valve is very positive and accurate. Further, that the valve has no movement until the desired temperature is reached, when it operates instantly to cut off the steam. It will also be seen that the valve is always either fully open or fully closed, thus preventing "wire drawing" or like effects. Further, as compared with the known expansion steam traps, the work of controlling the flow of the steam is transferred from the thermostat to the main valve.

In all cases in lieu of the hole $c'$ in the piston, the piston may be a slack fit in the extension $a'$. Further, instead of the hole in the piston or diaphragm, there may be a port or passage in the valve casing, extending from the "valve" to the "vent" side of the piston.

What we claim is:—

1. In fluid-operated and thermostatically controlled valve mechanism, a valve, and valve casing, said casing having a cylindrical extension on the high pressure side of the valve, and said extension being closed at the end farthest from the valve except for a small orifice or vent which opens to the atmosphere, a piston of larger diameter than the valve within the valve casing extension and having a small hole, means for connecting the piston to the valve, a spring for urging the piston and valve toward the valve seating, a further casing connected to the valve casing extension, and said casing having a branch by which it may communicate with the fluid to be controlled, a thermostat within the further casing comprising a corrugated tube with closed end, an adjustable cylinder inclosing the corrugated tube, an expansive element completely filling the space between the cylinder and the tube, and a spindle connected to the closed end of the tube and projecting through the opposite end of the tube, the point of the said spindle coming opposite to and being designed to cover or uncover the hole in the end of the valve casing extension under the expansion or contraction of the said element, and said casing having a partition with central opening, and packing in such opening, through which the said thermostat cylinder may slide, as set forth.

2. In fluid-operated and thermostatically controlled valve mechanism, a valve, and valve casing, said casing having a cylindrical extension on the high pressure side of the valve, and said extension being closed at the end farthest from the valve except for a small orifice or vent which opens to the atmosphere, a piston of larger diameter than the valve within the valve casing extension and having a small hole, means for connecting the piston to the valve, a spring for urging the piston and valve toward the valve seating, a further casing connected to the valve casing extension, and said casing having a branch by which it may be connected to the cylinder of a water heater and through which the water may circulate, a thermostat within the further casing comprising a corrugated tube with closed end, an adjustable cylinder inclosing the corrugated tube, an expansive element completely filling the space between the cylinder and the tube and a spindle connected to the closed end of the tube and projecting through the opposite end of the tube, the point of the said spindle coming opposite to and being designed to cover or uncover the hole in the end of the valve casing extension under the expansion or contraction of the said element, and said casing having a partition with central opening, and packing in such opening, through which the said thermostat cylinder may slide, as set forth.

3. In fluid-operated and thermostatically controlled valve mechanism, a valve, and valve casing, said casing having a cylindrical extension on the high pressure side of the valve, and said extension being closed at the end farthest from the valve except for a small orifice or vent which opens to the atmosphere, a piston of larger diameter than the valve within the valve casing extension and having a small hole, means for connecting the piston to the valve, a spring for urging the piston and valve toward the valve seating, a further casing connected to the valve casing extension, and said casing having a branch by which it may be connected to the cylinder of a water heater and through which the water may circulate, a thermostat within the further casing comprising an elongated corrugated tube of comparatively small diameter, with one end closed, and open at the other end, an adjustable cylinder inclosing the corrugated tube, which latter is connected at its open end to one end of the adjustable cylinder, the space between the tube and cylinder being sealed and such space being completely filled with an expansive liquid, a spindle connected to the closed end of the tube and projecting through the open end of the tube, the point of said spindle coming opposite to and being designed to cover or uncover the hole in the end of the valve casing extension under the expansion or contraction of the said liquid, and said further casing having a partition with central opening, and packing in such opening, through which the said thermostat cylinder may slide when adjusted, as set forth.

In witness whereof we have hereunto set our hands in the presence of two witnesses.

JOHN JAMES ROYLE.
GEORGE ERIC ROYLE.

Witnesses:
F. C. PENNINGTON,
F. J. MEREDITH.